(12) United States Patent
Revelis (10) Patent No.: US 7,694,782 B2
(45) Date of Patent: Apr. 13, 2010

(54) DEVICE AND METHOD FOR PRE-STRESSING THE CABLE SYSTEM OF A VEHICLE BRAKE ACTUATING SYSTEM

(75) Inventor: Peter Revelis, Newmarket (CA)

(73) Assignee: Ventra Group, Inc., Ontario (CA)

( * ) Notice: Subject to any disclaimer, the term of this patent is extended or adjusted under 35 U.S.C. 154(b) by 1262 days.

(21) Appl. No.: 11/201,108

(22) Filed: Aug. 11, 2005

(65) Prior Publication Data

US 2007/0034040 A1   Feb. 15, 2007

(51) Int. Cl.
*B60T 1/00* (2006.01)

(52) U.S. Cl. .............. 188/2 D; 188/196 M; 74/500.5; 74/501.5 R (58) Field of Classification Search .......... 188/2 D, 188/71.7, 196 R, 196 M, 196 V; 74/501.5 R, 74/500.5, 502.4, 502.6, 501.6, 523
See application file for complete search history.

(56) References Cited

U.S. PATENT DOCUMENTS

| | | | |
|---|---|---|---|
| 4,034,622 A | | 7/1977 | Deck |
| 4,379,500 A | * | 4/1983 | Kamino .................. 188/196 B |
| RE31,956 E | | 7/1985 | Deck |
| 4,584,898 A | * | 4/1986 | Panushka ............... 74/501.5 R |
| 4,614,130 A | * | 9/1986 | Heismann et al. ....... 74/501.5 R |
| 4,838,109 A | * | 6/1989 | Stewart ................ 74/501.5 R |
| 4,936,161 A | | 6/1990 | Polando |
| 5,528,957 A | | 6/1996 | Belmond et al. |
| 5,813,290 A | | 9/1998 | Takahashi et al. |
| 5,910,194 A | * | 6/1999 | Cho .......................... 74/500.5 |
| 5,983,745 A | | 11/1999 | Petrak |
| 6,575,270 B2 | * | 6/2003 | Farenden .................. 188/2 D |
| 2002/0011129 A1 | | 1/2002 | Petrak |
| 2003/0075001 A1 | | 4/2003 | Petrak |
| 2003/0146058 A1 | * | 8/2003 | Mai et al. ................ 188/196 F |
| 2003/0227010 A1 | | 12/2003 | Petrak |

FOREIGN PATENT DOCUMENTS

JP         11-198779 A   *   7/1999

* cited by examiner

*Primary Examiner*—Robert A Siconolfi
*Assistant Examiner*—Mariano Sy
(74) *Attorney, Agent, or Firm*—Pillsbury Winthrop Shaw Pittman LLP (57) ABSTRACT

A brake actuating system in a motor vehicle having wheels and brakes for braking rotation of the wheels includes a cable system including a plurality of cables operatively connected to the brakes of the vehicle. An actuator is operatively connected to the cable system and is operable by an occupant of the vehicle for movement between applied and released positions to selectively increase and decrease the tension in the cables of the cable system to thereby activate and deactivate the brakes of the vehicle, respectively. A cable tensioner including a rotary input member is selectively and adjustably coupled to an input side cable of the cable system. The input member is rotatable in tensioning and releasing directions. The input side cable includes a retaining structure that prevents disengagement of the input member from the input side cable when the input member is rotated in the releasing direction.

16 Claims, 7 Drawing Sheets

DEVICE AND METHOD FOR PRE-STRESSING THE CABLE SYSTEM OF A VEHICLE BRAKE ACTUATING SYSTEM

BACKGROUND OF THE INVENTION

1. Field of the Invention

The present invention relates to a device and method for pre-stressing the cable system of a vehicle brake actuating system.

2. Brief Description of Related Art

After installing a brake system in a motor vehicle, it is often desirable to "pre-stress" the cables of the brake system to reduce the development of slack in the cables from load setting that may occur during the early life of the vehicle. For example, in a brake system that has not been pre-stressed and uses cables that are guided by flexible conduits extending between the actuator and the brakes, when the brakes are first applied, the tension in the cables tends to cause some straightening at their bends, which will in turn cause compression of the conduits. Compression of the conduits in turn leads to the cables developing an "apparent stretch." This term describes the condition of the cable behaving as if it had become longer, when in fact its guide conduit has become shorter. In systems with no slack take-up mechanism, this presents the problem of losing cable tension relatively early in the vehicle's life. Even in systems with a slack take-up device, it is undesirable to have to waste the slack take-up capability on this development of apparent stretch and would be beneficial to preserve the slack take-up capability for taking up slack due to actual cable stretch that can occur over a much longer period of time.

One way to deal with this issue is to repeatedly operate the actuator to increase and decrease the tension in the cables prior to shipping the vehicle, thereby compressing the cable conduits. This pre-stressing reduces the development of subsequent compression of the cable conduits and the accompanying development of apparent cable stretch. However, for manually operated brake actuators, it is labor intensive to have a person repeatedly operate the actuator a sufficient number of times to effectively pre-stress the brake system (usually 10 or more times is desirable). Also, this type of work can lead to repetitive motion disorders for the worker assigned to this task.

U.S. Patent Application No. 2003/0227010A1 discloses one approach to pre-stressing the system. However, this approach is unsatisfactory because it requires a specialized tool that may not interface well with some vehicle designs.

Another approach to pre-stressing the system is disclosed in U.S. Pat. No. 5,983,745 and U.S. Patent Application No. 2002/011129A1. This approach works by using a shear tab in its cable connector. The shear tab is positioned so that as the actuator is operated, the tension applied to the cables is much higher than would normally be experienced, and ultimately the shear tab breaks. Then the cable tension is relaxed to a normal operational range. This approach is a "one-shot" approach, as the shear tab breaks on the first operation of the actuator, and relies on using an extra high amount of cable tension. This approach suffers the drawback that it does not replicate the repeated, cyclical type of operation that a brake system experiences during usage.

The present invention provides an improved device and method for pre-stressing the cable system of a vehicle brake actuating system.

SUMMARY OF THE INVENTION

One aspect of the invention relates to a brake actuating system in a motor vehicle having wheels and brakes for braking rotation of the wheels. The brake actuating system includes a cable system including a plurality of cables operatively connected to the brakes of the vehicle such that increasing tension in the cables activates the brakes and then decreasing the tension in the cables deactivates the brakes. An actuator is operatively connected to the cable system. The cable system includes an input side cable operatively connecting the cables to the actuator and at least one output side cable operatively connecting the cables to the brakes of the vehicle. The actuator is operable by an occupant of the vehicle for movement between applied and released positions to selectively increase and decrease the tension in the cables of the cable system to thereby activate and deactivate the brakes of the vehicle, respectively. A cable tensioner is structured to interconnect the actuator and the cable system. The cable tensioner includes a rotary input member that is constructed to be rotatably driven by a torque applying device. The rotary input member is selectively and adjustably coupled to the input side cable of the cable system and has a surface engaged with the actuator such that rotating the rotary input member in (1) a tensioning direction increases the tension in the cable system, and (2) a releasing direction decreases the tension in the cable system. The input side cable includes a retaining structure on a free end thereof that prevents disengagement of the rotary input member from the input side cable when the rotary input member is rotated in the releasing direction.

Another aspect of the invention relates to a method for pre-stressing a cable system of a brake actuating system in a motor vehicle having wheels and brakes for braking rotation of the wheels. The cable system includes a plurality of cables operatively connected to the brakes of the vehicle such that increasing tension in the cables activates the brakes and decreasing tension in the cables deactivates the brakes. The brake actuating system further includes an actuator operatively connected to the cable system. The cable system includes an input side cable operatively connecting the cables to the actuator and at least one output side cable operatively connecting the cables to the brakes of the vehicle. The actuator is operable by an occupant of the vehicle for movement between applied and released positions to selectively increase and decrease the tension in the cables of the cable system to thereby activate and deactivate the brakes of the vehicle, respectively. A cable tensioner is structured to interconnect the actuator and the cable system. The cable tensioner includes a rotary input member that is constructed to be rotatably driven by a torque applying device. The rotary input member is selectively and adjustably coupled to the input side cable of the cable system and has a surface engaged with the actuator such that rotating the rotary input member in (1) a tensioning direction increases the tension in the cable system, and (2) a releasing direction decreases the tension in the cable system. The method includes: rotating the rotary input member with the torque applying device in the tensioning direction to set the tension in the cable system at a pre-stressing level that is at least equal to a level of tension required to activate the brakes; allowing the cable system to load soak for a period of time; and after the period of time, rotating the rotary input member with the torque applying device in at least the releasing direction to reduce the tension in the cable system and set the tension in the cable system to an operating level.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

FIGS. 1-4 illustrate a brake actuating system 10 constructed according to an embodiment of the present invention. The brake actuating system 10 is constructed for use in a motor vehicle, such as a car or truck, having wheels and brakes for braking rotation of the wheels. The brake actuating system 10 illustrated is of the type typically referred to as a parking or emergency brake system. In general, the brake actuating system 10 includes a cable system 12, an actuator 14 operatively connected to the cable system 12, and a cable tensioner 16.

Figure 9:
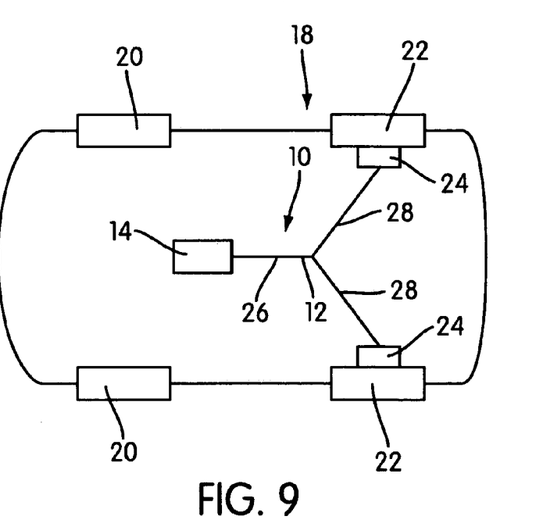
FIG. 9 is a schematic view of a vehicle illustrating the brakes and brake actuating system thereof.

FIG. 9 schematically illustrates a motor vehicle 18 having a pair of front wheels 20 and a pair of rear wheels 22. As illustrated, the rear wheels 22 include brakes 24, which are operable to apply a braking force to the rear wheels 22 in order to slow and/or stop the vehicle 18 when in motion, or to prevent movement of the vehicle 18 when stopped. However, both the front and rear wheels 20, 22 may include brakes.

The cable system 12 includes a plurality of cables operatively connected to the brakes 24 of the vehicle 18 such that increasing tension in the cables activates the brakes 24 and then decreasing the tension in the cables deactivates the brakes 24. In the illustrated embodiment, the cable system 12 includes an input side cable 26 operatively connected to the actuator 14, and output side cables 28 operatively connected to the brakes 24. An equalizer may be coupled between the input side cable 26 and the output side cables 28 to equally distribute tension applied from the input side cable 26 to the output side cables 28. However, the cable system 12 may have any suitable layout and the illustrated embodiment is not intended to be limiting.

For most systems, the cables are nylon-coated steel strands that are slidably received in flexible conduits. These cable/conduit constructions are commonly referred to as Bowden cables and are well known in the art. Also, the flexibility of such cable/conduit constructions allows them to be routed in curved paths, which is especially useful in a vehicle where many components are arranged compactly together, and the cable/conduits constructions can be routed around these various components as needed.

The actuator 14 is operable by an occupant of the vehicle, e.g., a driver, for movement between applied and released positions to selectively increase and decrease the tension in the cables 26, 28 of the cable system 12 to thereby activate and deactivate the brakes 24 of the vehicle 18, respectively. That is, the actuator 14 is operable to pull the cables 26, 28 in a brake-applying direction towards an applied position wherein increased tension is supplied to the cables 26, 28 such that the brakes 24 apply a braking force to the wheels 22. Conversely, the actuator 14 is movable to a released position wherein tension in the cables 26, 28 is relaxed such that the brakes 24 release the braking force from the wheels 22.

In the illustrated embodiment, the actuator 14 is a hand-operated pull lever mounted adjacent the driver's seat of the vehicle 18. However, the actuator 14 may be a foot-operated pedal assembly mounted beneath the dashboard of the vehicle 18, or it may be a powered actuator that uses mechanical or electrical power from the vehicle 18 for operation. The actuator 14 may have any suitable construction that is operable by the occupant to selectively increase and decrease the tension in the cables of the cable system 12.

As shown in FIGS. 1-4, the actuator 14 includes a lever 30 having a main body 32 and an elongated arm member 34 extending outwardly therefrom. The main body 32 is pivotally mounted to a fixed mounting bracket 36 by passing a rivet or other fastener through an opening provided in the main body 32. The lever 30 may be stamped from one piece of sheet metal, which may be heat treated steel. Molded plastic may be formed around the arm member 34 for aesthetic purposes and a molded plastic hand grip (not shown) may be molded on the distal free end thereof. However, the lever 30 may be constructed in any other suitable manner.

An output member 38 is rigidly secured to the main body 32 of the lever 30, e.g., by a plurality of rivets or other fasteners. The output member 38 may be any structure to which the cable(s) are coupled for operative connection to the actuator 14. The output member 38 is configured such that when the output member 38 is secured to the lever 30, the side face of the main body 32 and the output member 38 together form an arcuate-shaped cable receiving portion 40 and an elongated cable receiving portion 42. A proximal end of the input side cable 26 extends through the arcuate-shaped cable receiving portion 40 and the elongated cable receiving portion 42, and couples with the cable tensioner 16. The cable tensioner 16 also has a surface engaged with the actuator 14. This arrangement interconnects the cable system 12 and the actuator 14 such that operation of the actuator 14 increases and decreases tension in the cables of the cable system 12. Moreover, the cable tensioner 16 is selectively and adjustably coupled to the input side cable 26 for adjusting the operating tension in the cable system 12, as will be further discussed below.

The remaining components of the actuator 14 are mostly conventional and need not be described in detail. That is, the actuator 14 may carry a pivotally mounted pawl that engages a sector gear 44 (e.g., see FIGS. 1 and 2) usually provided on the fixed mounting bracket 36. As the actuator 14 is pivoted upwardly in a brake applying direction, the pawl will ratchet over sector gear 44 and then maintain the actuator 14 in place at the selected applied position. Thereafter, the actuator 14 may be released, e.g., by pushing a push button, to disengage the pawl from the sector gear 44, and thus allow for return of the actuator 14 in the brake releasing direction to its released position.

The actuator 14 may have any suitable construction or configuration and the one illustrated is in no way intended to be limiting. To the contrary, the actuator 14 described herein is only being provided as context for describing the cable tensioner 16 and the manner in which it pre-stresses the cable system 12. Any actuator 14 having any type of output member that moves and to which a cable may be connected may be used.

The cable tensioner 16 interconnects the actuator 14 and the cable system 12. In the illustrated embodiment, the cable tensioner 16 includes a rotary input member 46 in the form of a nut. The nut 46 is constructed to be rotatably driven by a torque applying device. Specifically, the nut 46 includes an internally threaded bore (not shown) and outwardly facing drive surfaces 48 structured to engage the torque applying device in torque receiving relation. The nut 46 may have a suitable number of drive surfaces 48, e.g., four point, six point, twelve point, etc.

The input side cable 26 includes a threaded rod 50 mounted on the proximal end thereof. Specifically, the threaded rod 50 includes a forward threaded portion 52 and a rearward mounting portion 54 (e.g., see FIG. 8). The rearward mounting portion 54 is secured to the input side cable 26 in any suitable manner. The nut 46 is threadably engaged with the threaded portion 52 of the threaded rod 50. As a result, the nut 46 may be rotated to adjust its position on the threaded rod 50.

The nut 46 also includes a flange 56 that provides a generally forwardly facing surface 58 that is engagable in abutting relation with a generally rearwardly facing surface 60 provided on the actuator 14. In the illustrated embodiment, the forwardly facing and rearwardly facing surfaces 58, 60 have generally planar configurations. However, it is to be understood that these surfaces may have any other suitable shape. When the input side cable 26 is moved relative to the actuator 14, e.g., by operation of the actuator 14 or adjustment of the nut 46, the tension load from the cable system 12 is transferred from the threaded rod 50 to the nut 46, and from the nut 46 to the actuator 14 via the engagement between surfaces 58, 60.

The threaded engagement between the nut 46 and rod 50 also allows the nut 46 to be selectively rotated to create movement of the rod 50 so that the tension in the cable system 12 can be selectively adjusted. That is, the nut 46 can be adjusted in an appropriate direction relative to the rod 50 on the input side cable 26 to adjust the position of the input side cable 26 with respect to the actuator 14, thus selectively adjusting the amount of tension in the cable system 12. For example, rotating the nut 46 in a tensioning direction increases the tension in the cable system 12, and rotating the nut 46 in a releasing direction decreases the tension in the cable system 12. Specifically, rotating the nut 46 causes the rod 50 to travel axially within the bore of the nut 46 with the nut 46 staying engaged with surface 60 on the actuator 14 to either increase or decrease tension in the cable system 12, as applicable.

Also, the threaded engagement between the nut 46 and rod 50 enables the nut 46 to be rotated until reaching a desired level of tension in the cable system 12, and thereafter prevents the tension from moving the input side cable 26 and the actuator 14 relative to one another in the releasing direction.

The cable tensioner 16 can be used to pre-stress the cable system 12 by adjusting the nut 46 to increase and decrease the tension in the cable system 12. In general, the method for pre-stressing the cable system 12 includes rotating the nut 46 with the torque applying device in the tensioning direction to set the tension in the cable system 12 at a pre-stressing level that is at least equal to a level of tension required to activate the brakes 24, allowing the cable system 12 to load soak for a period of time, and then rotating the nut 46 with the torque applying device at least in the releasing direction to reduce the tension in the cable system 12 and set the tension in the cable system 12 to an operating level.

Figure 1:
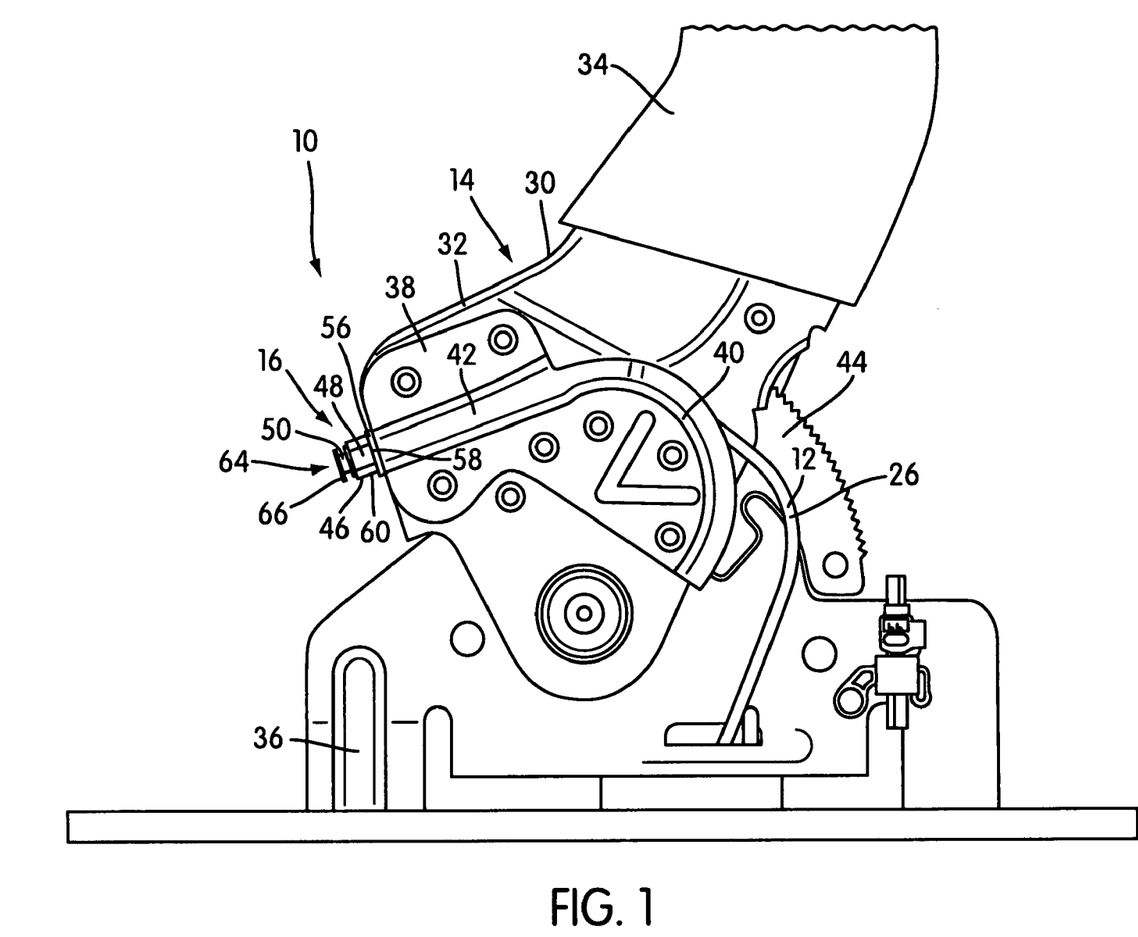
FIG. 1 is a side view of a brake actuating system constructed in accordance with an embodiment of the invention, the actuator of the brake actuating system in an applied position.

A preferred method for pre-stressing the cable system 12 with the cable tensioner 16 will now be described in greater detail. The pre-stressing procedure is typically done in the OEM plant prior to delivery to the customer. As shown in FIG. 1, the actuator 14 is initially in the applied position. This position of the actuator 14 is preferred for several reasons. To begin with, the travel afforded by the threaded rod 50 is limited, thereby allowing only a limited amount of cable tension increase until the nut 46 runs out on the threaded rod 50. With the actuator 14 in the applied position, some initial slack in the cables is taken up before rotating the nut 46, thus increasing the ultimate amount of tension that can be created by rotating the nut 46. Also, the actuator 14 is typically moved into the applied position in order to install the actuator 14 to the console of the vehicle. However, the cable system 12 may be pre-stressed by the cable tensioner 16 with the actuator 14 initially in the released position.

Figure 2:
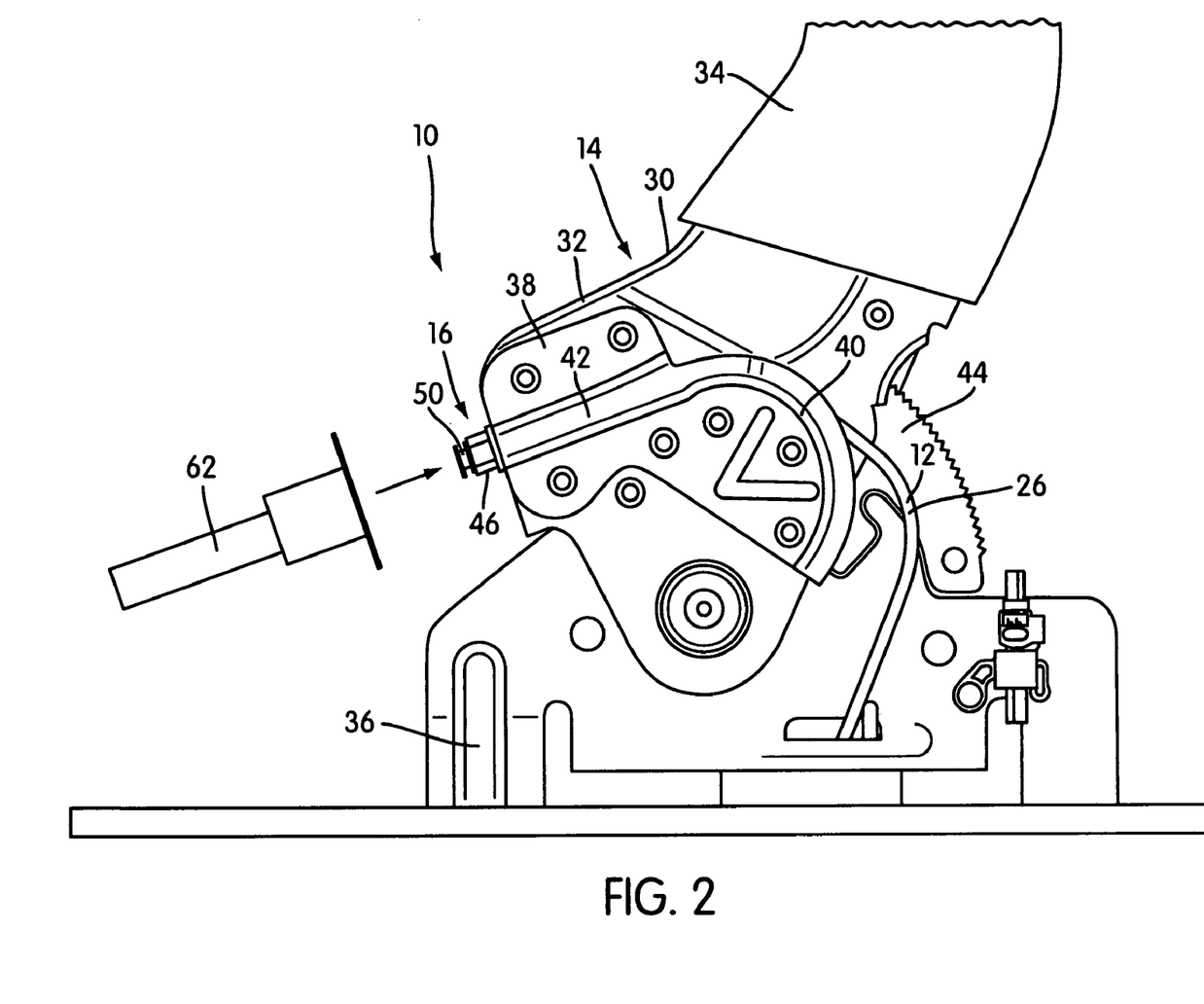
FIG. 2 is a side view of the brake actuating system shown in FIG. 1 illustrating a torque applying device being engaged with the rotary input member of the brake actuating system.
Figure 3:
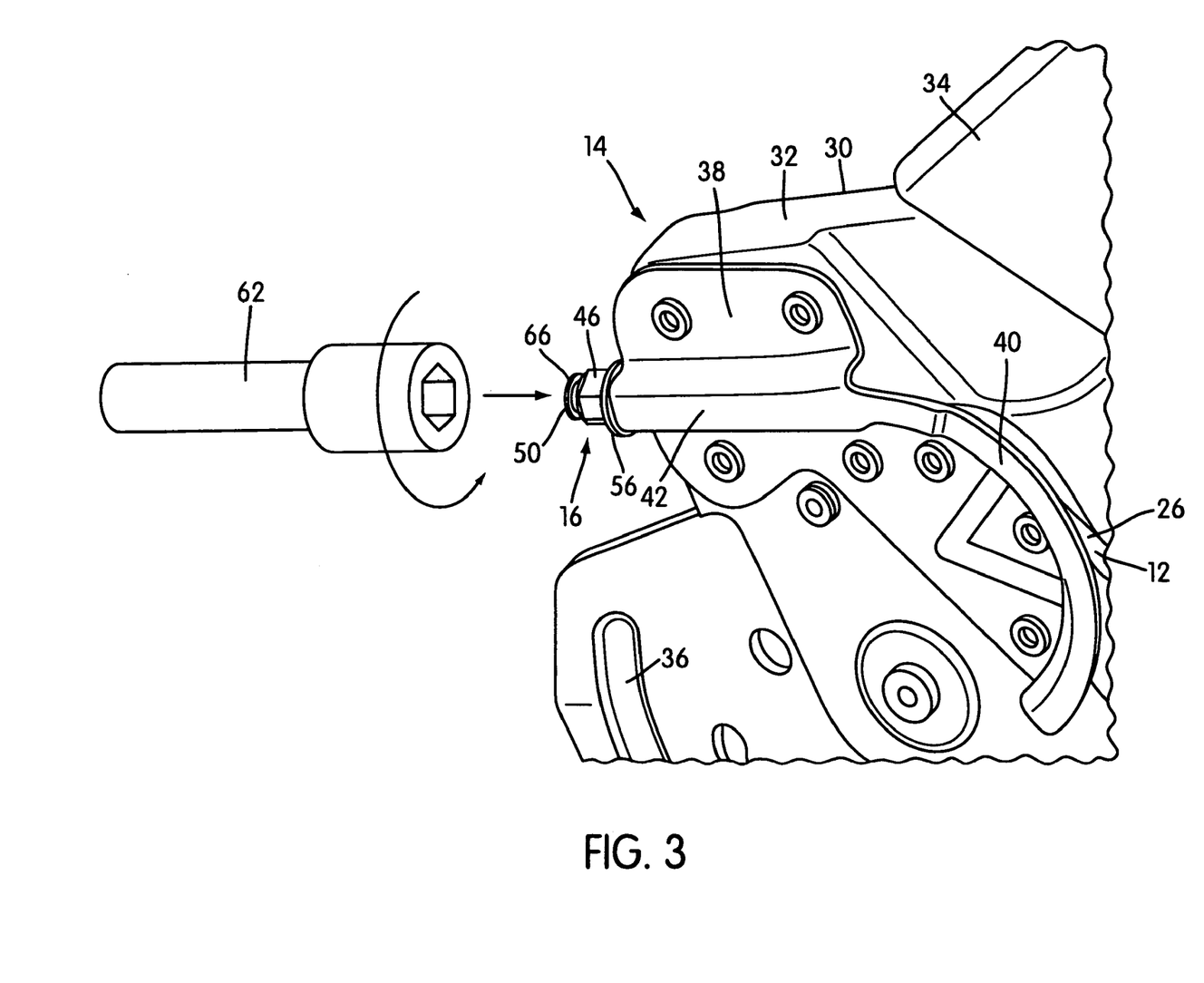
FIG. 3 is perspective view of the brake actuating system shown in FIG. 1 illustrating a torque applying device being engaged with the rotary input member of the brake actuating system.

With the actuator 14 in the applied position, the nut 46 is engaged and rotated with the torque applying device 62 in the tensioning direction until reaching a pre-stressing level of tension in the cable system 12 that is at least equal to, and preferably exceeds, a level of tension required to activate the brakes 24 (see FIGS. 2 and 3). That is, the nut 46 is rotated a sufficient number of times with the torque applying device 62 such that the tension and cable travel experienced by the cable system 12 exceeds the tension and cable travel that would normally be experienced during the early life of the vehicle. This creates a higher tension in the cable system 12 than would normally be experienced during normal operation of the actuator 14.

Once the pre-stressing level of tension is reached, rotation of the torque applying device 62 is stopped and the pre-stressing level of tension in the cable system 12 is maintained for a period of time. This "load soaks" the cable system 12 to allow conduit compression of the cable system 12 to occur for a period of time. Specifically, under this increased cable tension, the conduits will compress and maintaining the increased load for a period of time will enhance such compression. As a result, conduit compression can occur in the factory prior to final release of the vehicle, rather than during the early life of the vehicle after it has been sold to an end user.

After the period of time, the nut 46 is rotated with the torque applying device 62 in the releasing direction to reduce the tension in the cable system 12 such that the tension is less than the pre-stressing level of tension. This relieves tension in the cable system 12 in order to facilitate movement of the actuator 14 into the released position in the subsequent step of the pre-stressing process. Specifically, a worker usually has to lift the actuator slightly prior to moving it downwardly to the released position for purposes of relieving the load borne by the pawl, and the decreased tension is ergonomically better because it reduces the force required by the worker.

The nut 46 should be rotated in the releasing direction sufficiently to ensure that the tension in the cable system 12 is low enough so that it will be below the operating tension, discussed below, when the actuator 12 is moved to it released position. This is done so that when the nut 46 is driven in the tensioning direction to reach the operating tension, as discussed below, there is no need to back the nut off further (this is particularly helpful when using a torque responsive torque gun for tightening the nut 46 to set the operating tension, as those devices typically only shut-off responsively at a predetermined torque as the torque is increasing, not decreasing). Also, reducing the tension level this far reduces the effort on the part of the worker that has to lift the actuator slightly prior to lowering the same to its released position.

Figure 4:
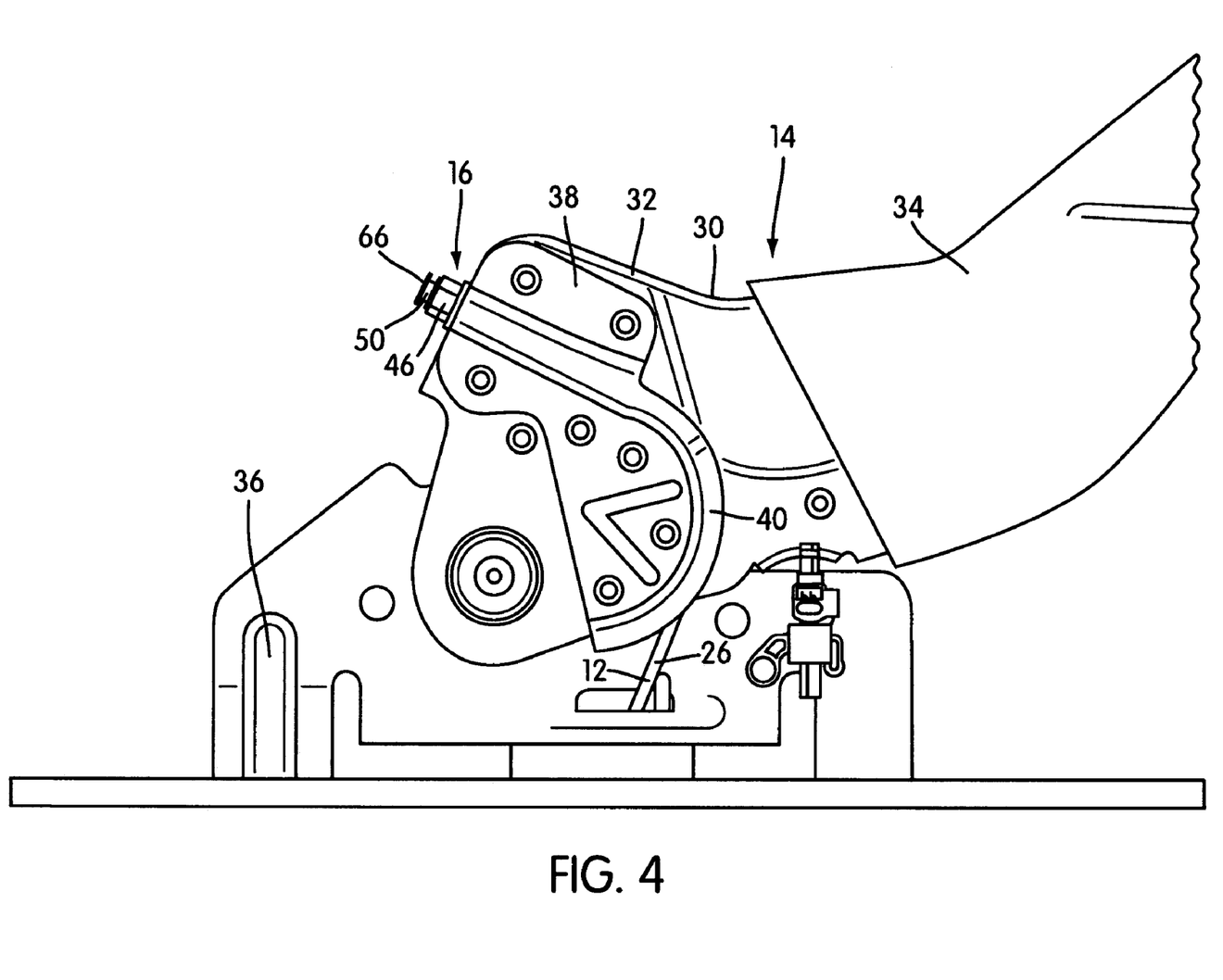
FIG. 4 is a side view of the brake actuating system shown in FIG. 1 illustrating the actuator of the brake actuating system in a released position.

Then, the actuator 14 is manually moved into a released position, and preferably the fully released position as shown in FIG. 4. With the actuator 14 in the released position, the nut 46 is retightened to an operating level of tension. That is, the nut 46 is rotated with the torque applying device 62 in the tensioning direction until reaching an operating level of tension in the cable system 12. In an embodiment, the operating level of tension is less than the pre-stressing level of tension and greater than the reduced level of tension to facilitate movement of the actuator into the released position.

When retightened, the operating level of tension is preferably the desired tension that should be present when the actuator 14 is in its released position. This tension may vary based on vehicle manufacturer requirements, and is selected so that sufficient tension is generated in the cable system 12 to activate the brakes as the actuator 14 is moved towards its fully applied position. This level of tension is often referred to as the nominal tension.

If the actuator 14 is maintained in the released position, the pre-stressing process would include rotating the nut 46 in the tensioning direction until reaching the pre-stressing level of tension in the cable system 12, maintaining the pre-stressing level of tension in the cable system 12 for a period of time sufficient for load soaking, and then rotating the nut 46 in the releasing direction, and possibly back in the tensioning direction, until reaching an operating level of tension in the cable system 12.

As shown in FIGS. 1-4, the threaded rod 50 includes a retaining structure 64 on a free end thereof that prevents disengagement of the nut 46 from the threaded rod 50 when the nut 46 is rotated in the releasing direction. If the nut 46 were to disengage from the threaded rod 50, the input side cable 26 could become disengaged from the actuator 14 and output member 38 thereof. This would require extra labor and possible downtime in the OEM plant to re-couple the input side cable 26 with the actuator 14. Also, the retaining structure 64 may be used as a stop for determining the reduced level of tension to facilitate movement of the actuator into the released position.

As illustrated in FIGS. 1-4, the retaining structure 50 is in the form of a flange 66 provided on the free end of the threaded rod 50. The flange 66 may be fixed by welding, mechanically deforming the end of the rod 50, or in any other suitable way.

Figure 5:
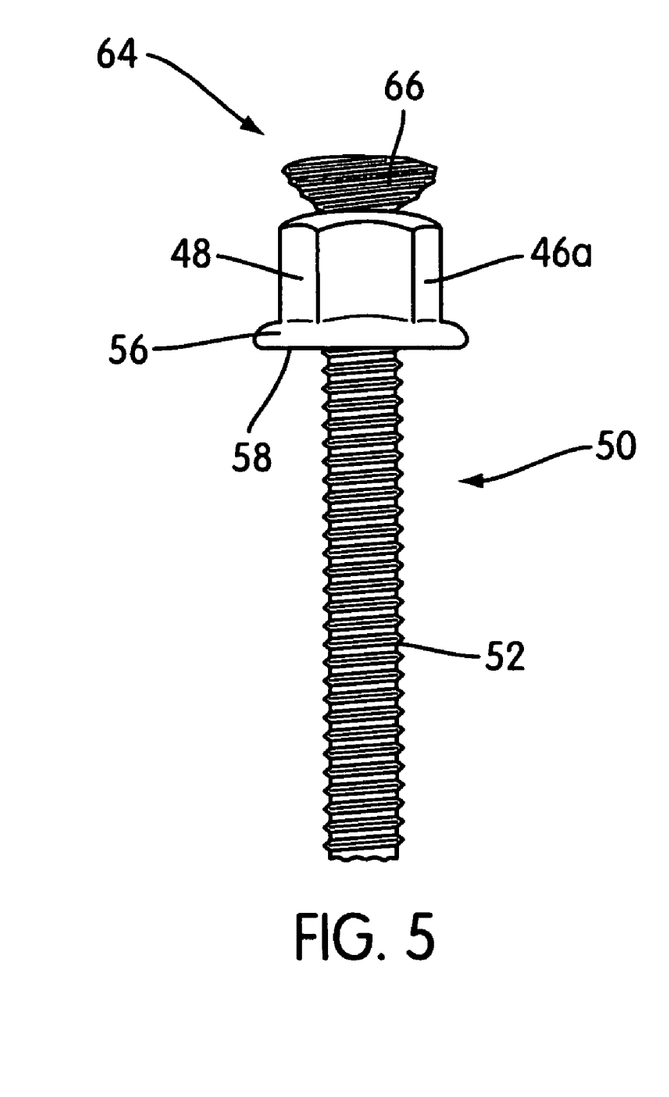
FIG. 5 is a side view illustrating an embodiment of a rotary input member of the brake actuating system coupled to an embodiment of a threaded rod provided on an end of the cable system of the brake actuating system.
Figure 6:
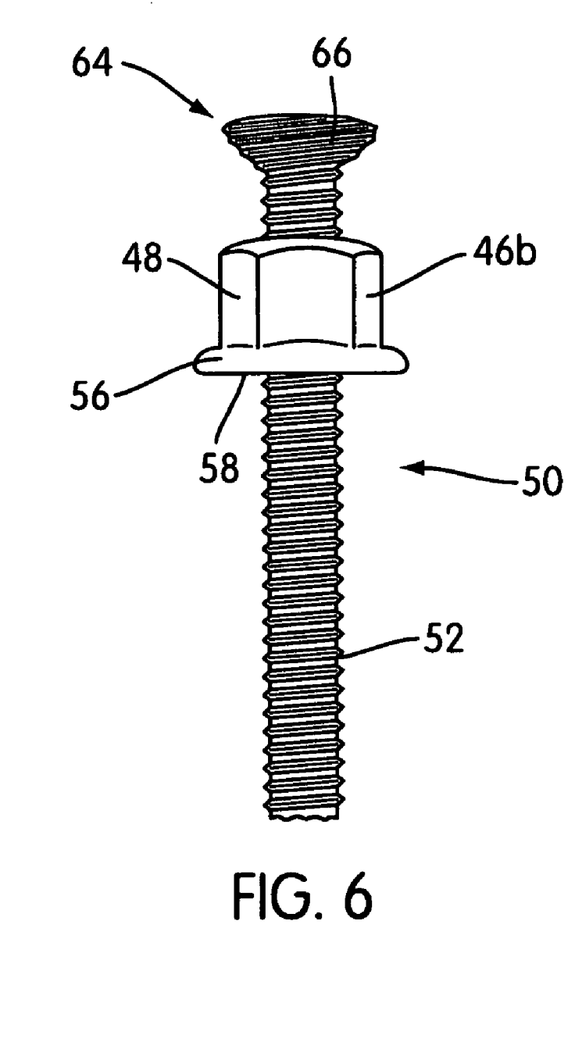
FIG. 6 is a side view illustrating another embodiment of a rotary input member of the brake actuating system coupled to an embodiment of a threaded rod provided on an end of the cable system of the brake actuating system.

FIGS. 5 and 6 show an enlarged view of the threaded rod 50 and flange 66 thereof. As illustrated, the diameter of the flange 66 is smaller than the external diameter of the nut 46 to allow the torque applying device to engage the nut 46 without interference from the flange 66. The nut 46 may be constructed of any suitable material, and the construction may depend on the diameter of the threaded rod 50 and the levels of tension in the cable system 12. For example, FIG. 5 illustrates a mechanical stake torque prevailing nut 46a on the threaded rod 50 and FIG. 6 illustrates a nylon insert hex flange torque prevailing nut 46b on the threaded rod 50.

Figure 7:
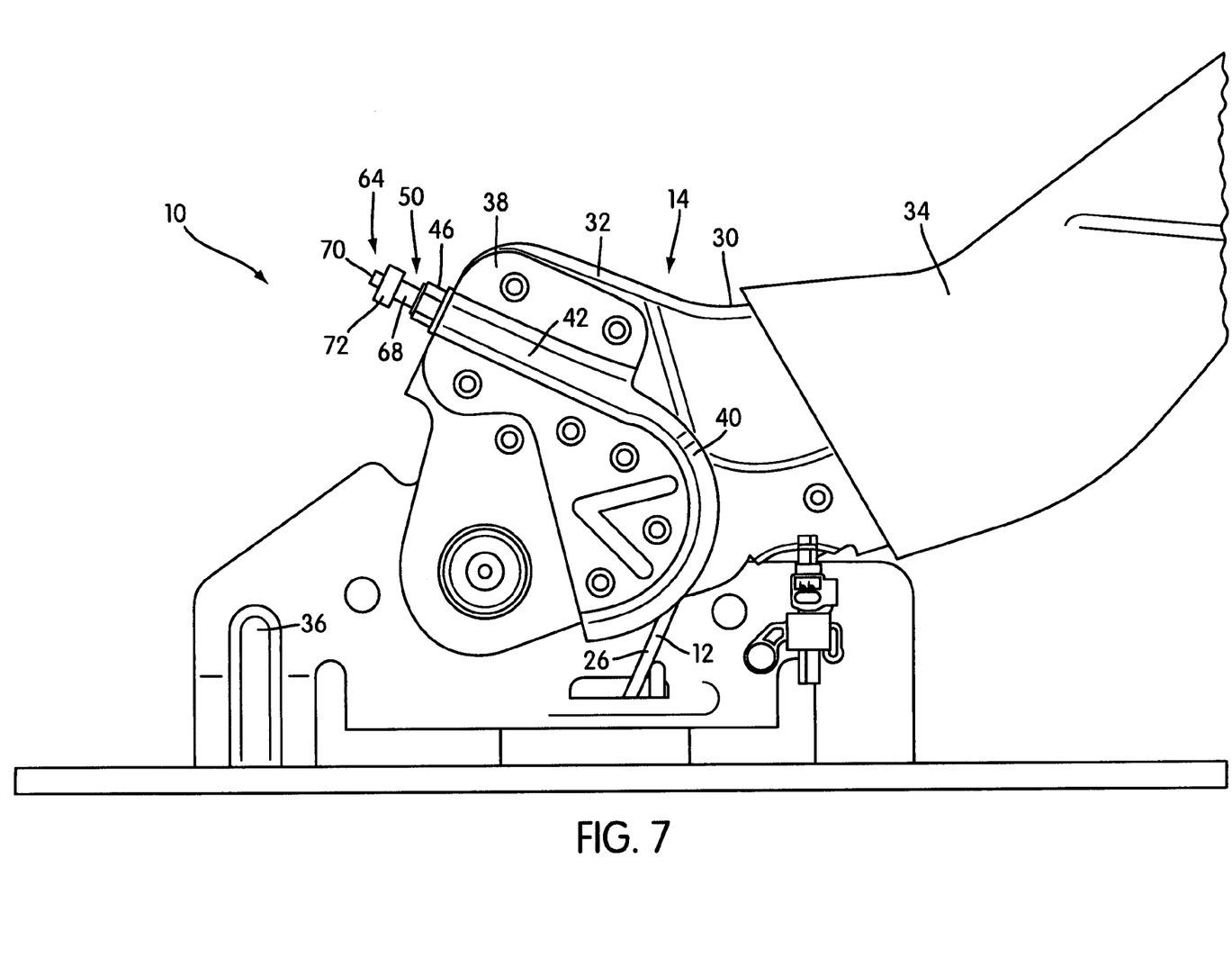
FIG. 7 is a side view illustrating another embodiment of a brake actuating system, the actuator of the brake actuating system in a released position.
Figure 8:
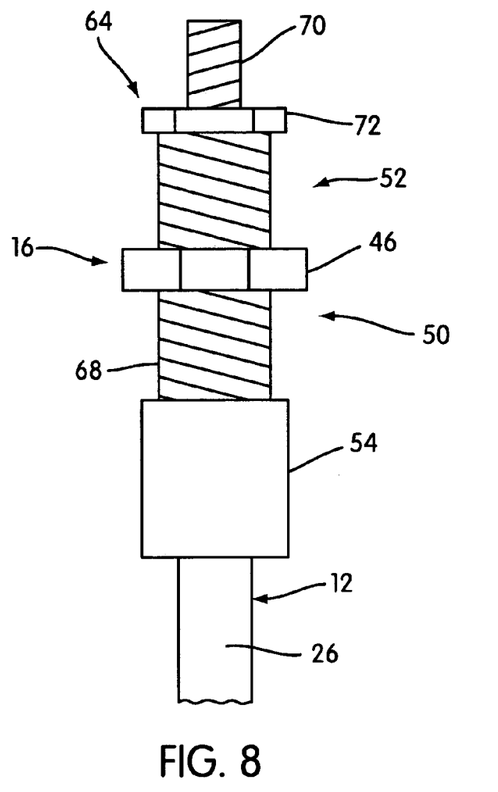
FIG. 8 is a side view illustrating an embodiment of the rotary input member of the brake actuating system shown in FIG. 7 coupled to an embodiment of a threaded rod provided on an end of the cable system of the brake actuating system.

FIGS. 7 and 8 illustrate another embodiment of a retaining structure 64 provided on the free end of the threaded rod 50. As illustrated, the threaded rod 50 has a stepped configuration that provides a first threaded portion 68 and a second threaded portion 70. The first threaded portion 68 has threads arranged in a first orientation, e.g., right hand thread, and the second threaded portion 70 has threads arranged in a second orientation, e.g., left hand thread, that is opposite to the first orientation. The nut 46 is threadably engaged with the first threaded portion 68. The retaining structure 64 is in the form of a locking nut 72 that is threadably engaged with the second threaded portion 70 and positioned immediately adjacent the shoulder between the two threaded portions 68, 70.

Because the first nut 46 has a larger diameter than the nut 72, the socket of the torque applying device will not engage the nut 72 and will only drive nut 46. As nut 46 is driven in the tensioning direction, the nut 72 will remain undisturbed. Likewise, when the nut 46 is driven in the releasing direction, the nut 72 will normally be undisturbed. However, if the nut 46 is driven in the releasing direction so far back that it engages the nut 72, the nuts 46 and 72 will become frictionally engaged and the nut 72 will attempt to start rotating in the same direction as the nut 46. Because the threaded portions 68, 70 are threaded in opposite directions, this will cause nut 72 to bind tightly against the nut 46 and restrict further rotation and travel of the nut 46 in the releasing direction. This arrangement is particularly advantageous because it prevents the locking nut 46 from disengaging from the rod 50 as the nut 46 is rotated in the releasing direction.

In the illustrated embodiment, the first threaded portion 68 has a greater diameter than the second threaded portion 70. However, the threaded portions 68, 70 may have similar diameters.

In use, the flange 66 or locking nut 72 provided on the threaded rod 50 will prevent the nut 46 from disengaging from the threaded rod 50 when the nut 46 is rotated in the releasing direction.

When the nut 46 is rotated by the torque applying device, the pre-stressing level of tension and the operating level of tension in the cable system 12 may be established by a measure of torque in the torque applying device, e.g., using a conventional plant torque-responsive driving gun. That is, the level of tension in the cable system is a function of the torque applied to the nut (and vice versa), and the pre-stressing level of tension and the operating level of tension in the cable system 12 can be accurately applied by a torque applying device that is designed to responsively shut-off after reaching a pre-set level. For example, the torque applying device used to rotate the nut to reach the pre-stressing level of tension senses the torque being applied to the nut and responsively ceases rotation of the nut upon reaching a torque corresponding to the pre-stressing level of tension. Similarly, the torque applying device used to rotate the nut to reach the operating level of tension senses the torque being applied to the nut and responsively ceases rotation of the nut upon reaching a torque corresponding to the operating level of tension.

Conventional plant torque-responsive driving guns typically do not measure torque in the releasing direction, so the reduced level of tension to facilitate movement of the actuator into the released position can be established simply by rotating the nut a sufficient number of times in the releasing direction, e.g., into contact with the retaining structure 64.

Alternatively, the levels of tension may be determined by a combination of a measure of torque in a torque-responsive applying device, and a number of revolutions of the nut 46, e.g., using a positional control gun that counts the number of revolutions of the nut 46 and shuts off after reaching a pre-set number of rotations. For example, the torque applying device used to rotate the nut to reach the pre-stressing level of tension senses the torque being applied to the nut and responsively ceases rotation of the nut upon reaching a torque corresponding to the pre-stressing level of tension. After the pre-stressing level of tension is determined, the positional control gun can be used to move the nut to the reduced level of tension to facilitate movement of the actuator into the released position, and then to the operating level of tension. In use, the worker would ensure that the number of rotations to loosen the nut, e.g., 12 rotations, is greater than the number of rotations to tighten the nut, e.g., 8 rotations, into the operating position. This action ensures that the pre-stressing level of tension is greater than the operating level of tension. Of course, the positional control torque applying device could be used just to reduce the tension level to the operating level without the need to move the nut back in the tensioning direction.

Moreover, with the pre-stressing level determined by a torque responsive device, a positional control device can reach the operating level of tension with a reasonable degree of accuracy. This is because tension change in the cable system 12 is related to the linear travel of the nut 46. Assuming the pitch of the nut 46 and rod threads is known, the nut travel generated by the positional control torque device can be selected to achieve approximately the proper or target operating level of tension in the cable system 12. The one shortcoming of this approach is that in situations where the cable tension loss varies significantly during load soaking, the operating tension level set may likewise vary from its target value. However, the use of the positional control gun can prevent the need for the retaining structure 64 on the threaded rod 50, because the nut 46 can be accurately controlled by the positional control gun in the releasing direction to stop prior to the end of the threaded rod 50.

In yet another embodiment, the pre-stressing level of tension may be simply established by rotating the nut a sufficient number of times in the tensioning direction to ensure a high level of torque is applied. Then, the nut may be loosened and then retightened into an operating position by a conventional torque-responsive driving gun. In this embodiment, the exact pre-stressing level of tension is not known, but the level will be sufficient to "load soak" the cable system. However, the exact operating level of tension will be known to ensure sufficient tension for activating the brakes.

The period of time for "load-soaking" the cable system may or may not be predetermined. In one embodiment, the pre-stressing the cable system, load-soaking the cable system, releasing tension in the cable system, and setting the operating tension level in the cable system is performed at one station in the assembly line at an OEM plant. The period of time for load-soaking may be predetermined or may be arbitrary.

In another embodiment, the pre-stressing the cable system 12 is performed at one station in the assembly line, the load soaking occurs while other actions are performed on the vehicle, and the releasing tension and setting the operating tension level is performed at a later station in the assembly line prior to delivery to the customer. This allows the cable system to load soak for a period of time as the vehicle travels from one station to another along the assembly line.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A brake actuating system in a motor vehicle having wheels and brakes for braking rotation of the wheels, the brake actuating system comprising:
   a cable system including a plurality of cables operatively connected to the brakes of the vehicle such that increasing tension in the cables activates the brakes and then decreasing the tension in the cables deactivates the brakes;
   an actuator operatively connected to the cable system, the cable system including an input side cable operatively connecting the cables to the actuator and at least one output side cable operatively connecting the cables to the brakes of the vehicle, the actuator being operable by an occupant of the vehicle for movement between applied and released positions to selectively increase and decrease the tension in the cables of the cable system to thereby activate and deactivate the brakes of the vehicle, respectively; and
   a cable tensioner structured to interconnect the actuator and the cable system, the cable tensioner including a rotary input member that is constructed to be rotatably driven by a torque applying device, the rotary input member being selectively and adjustably coupled to the input side cable of the cable system and having a surface engaged with the actuator such that rotating the rotary input member in (1) a tensioning direction increases the tension in The cable system, and (2) a releasing direction decreases the tension in the cable system,
   wherein the input side cable includes a retaining structure on a free end thereof that prevents disengagement of the rotary input member from the input side cable when the rotary input member is rotated in the releasing direction, and
   wherein the rotary input member has a larger diameter than the retaining structure such that the torque applying device is configured to engage only with the rotary input member, when the rotary input member is driven in the tensioning direction or the releasing direction.

2. The brake actuating system according to claim 1, wherein the rotary input member is a nut, the nut being threadably engaged with a threaded rod provided on a free end of the input side cable.

3. The brake actuating system according to claim 2, wherein the retaining structure is a flange provided on the free end of the threaded rod.

4. A brake actuating system in a motor vehicle having wheels and brakes for braking rotation of the wheels, the brake actuating system comprising:
   a cable system including a plurality of cables operatively connected to the brakes of the vehicle such that increasing tension in the cables activates the brakes and then decreasing the tension in the cables deactivates the brakes;
   an actuator operatively connected to the cable system, the cable system including an input side cable operatively connecting the cables to the actuator and at least one output side cable operatively connecting the cables to the brakes of the vehicle, the actuator being operable by an occupant of the vehicle for movement between applied and released positions to selectively increase and decrease the tension in the cables of the cable system to thereby activate and deactivate the brakes of the vehicle, respectively; and a cable tensioner structured to interconnect the actuator and the cable system, the cable tensioner including a rotary input member that is constructed to be rotatably driven by a torque applying device, the rotary input member being selectively and adjustably coupled to the input side cable of the cable system and having a surface engaged with the actuator such that rotating the rotary input member in (1) a tensioning direction increases the tension in the cable system, and (2) a releasing direction decreases the tension in the cable system, wherein the input side cable includes a retaining structure on a free end thereof that prevents disengagement of the rotary input member from the input side cable when the rotary input member is rotated in the releasing direction, wherein the rotary input member is a nut, the nut being threadably engaged with a threaded rod provided on a free end of the input side cable, wherein the threaded rod includes a first threaded portion and a second threaded portion, the first threaded portion having threads arranged in a first orientation and the second threaded portion having threads arranged in a second orientation that is opposite to the first orientation, and wherein the nut is threadably engaged with one of the first and second threaded portions and the retaining structure is a nut that is threadably engaged with the other of the first and second threaded portions.

5. The brake actuating system according to claim 4, wherein the first and second threaded portions have different diameters.

6. A method for pre-stressing a cable system of a brake actuating system in a motor vehicle having wheels and brakes for braking rotation of the wheels, the cable system including a plurality of cables operatively connected to the brakes of the vehicle such that increasing tension in the cables activates the brakes and decreasing the tension in the Cables deactivates the brakes; the brake actuating system further comprising (i) an actuator operatively connected to the cable system, the cable system including an input side cable operatively connecting the cables to the actuator and at least one output side cable operatively connecting the cables to the brakes of the vehicle, the actuator being operable by an occupant of the vehicle for movement between applied and released positions to selectively increase and decrease the tension in the cables of the cable system to thereby activate and deactivate the brakes of the vehicle, respectively; and (ii) a cable tensioner structured to interconnect the actuator and the cable system, the cable tensioner including a rotary input member that is constructed to be rotatably driven by a torque applying device, the rotary input member being selectively and adjustably coupled to the input side cable of the cable system and having a surface engaged with the actuator such that rotating the rotary input member in (1) a tensioning direction increases the tension in the cable system, and (2) a releasing direction decreases the tension in the cable system, wherein the input side cable includes a retaining structure on a free end thereof that prevents disengagement of the rotary input member from the input side cable when the rotary input member is rotated in the releasing direction, and wherein the rotary input member has a larger diameter than the retaining structure such that the torque applying device is configured to engage only with the rotary input member, when the rotary input member is driven in the tensioning direction or the releasing direction, the method comprising:

rotating the rotary input member with the torque applying device in the tensioning direction to set the tension in the cable system at a pre-stressing level that is at least equal to a level of tension required to activate the brakes;

allowing the cable system to load soak for a period of time; and after the period of time, rotating the rotary input member with the torque applying device in at least the releasing direction to reduce the tension in the cable system and set the tension in the cable system to an operating level.

7. The method according to claim 6, wherein after rotating the rotary input member in the releasing direction to reduce the tension in the cable system, the rotary input member is rotated with the torque applying device in the tensioning direction to increase the tension in the cable system to the operating level.

8. The method according to claim 7, wherein the actuator is in the applied position while rotating the rotary input member in the tensioning direction to set the tension in the cable system at the pre-stressing level; and wherein the actuator is moved to the released position after rotating the rotary input member in the releasing direction to reduce the tension in the cable system and before rotating the rotary input member in the tensioning direction to set the tension in the cable system at the operating level.

9. The method according to claim 8, wherein the pre-stressing level of tension in the cable system exceeds the level of tension required to activate the brakes.

10. The method according to claim 8, wherein the torque applying device used to rotate the rotary input member to set the tension in the cable system at the pre-stressing level senses the torque being applied to the rotary input member and responsively ceases rotation of the rotary input member upon reaching a torque corresponding to the pre-stressing level of tension.

11. The method according to claim 10, wherein the rotating the rotary input member with the torque applying device in the tensioning direction to set the tension in the cable system at the pre-stressing level occurs at one station in an assembly line, and the rotating the rotary input member with the torque applying device in at least the releasing direction to reduce the tension in the cable system and set the tension in the cable system at the operating level occurs at a subsequent station in the assembly line.

12. The method according to claim 6, wherein the torque applying device used to rotate the rotary input member to set the tension in the cable system at the pre-stressing level senses the torque being applied to the rotary input member and responsively ceases rotation of the rotary input member upon reaching a torque corresponding to the pre-stressing level of tension.

13. The method according to claim 7, wherein the torque applying device used to rotate the rotary input member to set the tension in the cable system at the operating level senses the torque being applied to the rotary input member and responsively ceases rotation of the rotary input member upon reaching a torque corresponding to the operating level of tension.

14. The method according to claim 6, wherein the rotating the rotary input member with the torque applying device in the tensioning direction to set the tension in the cable system at the pre-stressing level occurs at one station in an assembly line,: and the rotating the rotary input member with the torque applying device in at least the releasing direction to reduce the tension in the cable system and set the tension in the cable system at the operating level occurs at a subsequent station in the assembly line.

15. A method according to claim 6, wherein the rotating the rotary input member in the tensioning direction to set the tension in the cable system at a pre-stressing level is performed by a first torque applying device that rotates the rotary in put member until reaching a torque corresponding to the pre-stressing level, and the rotating the rotary input member in at least the releasing direction to reduce the tension in the cable system and set the tension in the cable system to an operating level is performed by a second torque applying device that rotates the rotary input member in at least the releasing direction until reaching a predetermined number of revolutions of the rotary input number.

16. A brake actuator device for use in a motor vehicle having wheels, brakes for braking rotation of the wheels and a cable system including a plurality of cables including an input side cable, the plurality of cables being operatively connected to the brakes of the vehicle such that increasing tension in the cables activates the brakes and then decreasing the tension in the cables deactivates the brakes, the brake actuator device comprising:

an actuator constructed to be operatively connected to the input side cable of the cable system, the actuator being operable by an occupant of the vehicle for movement between applied and released positions to selectively increase and decrease the tension in the cables of the cable system to thereby activate and deactivate the brakes of the vehicle, respectively; and a cable tensioner structured to interconnect the actuator and the cable system, the cable tensioner including a rotary input member that is constructed to be rotatably driven by a torque applying device, the rotary Input member being constructed to be selectively and adjustably coupled to an input side cable of the cable system and having a surface engaged with the actuator such that rotating the rotary input member in (1) a tensioning direction increases the tension in the cable system, and (2) a releasing direction decreases the tension in the cable system, wherein the input side cable includes a retaining structure on a free end thereof that prevents disengagement of the rotary input member from the input side cable when the rotary input member is rotated in the releasing direction, and wherein the rotary input member has a larger diameter than the retaining structure such that the torque applying device is configured to engage only with the rotary input member, when the rotary input member is driven in the tensioning direction or the releasing direction.

* * * * *